United States Patent
Oedewalt et al.

(10) Patent No.: US 11,826,684 B2
(45) Date of Patent: Nov. 28, 2023

(54) FILTER INTERLOCK WITH TABS MATING WITH A PEDESTAL OR A HOUSING

(71) Applicant: Caterpillar Inc., Peoria, IL (US)

(72) Inventors: Stephen Ellis Oedewalt, Mapleton, IL (US); Jon T. Immel, Chillicothe, IL (US); Jeffrey R. Ries, Metamora, IL (US); Darrell Lee Morehouse, III, Bedford, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/942,528

(22) Filed: Sep. 12, 2022

(65) Prior Publication Data

US 2023/0017685 A1  Jan. 19, 2023

Related U.S. Application Data

(62) Division of application No. 17/102,831, filed on Nov. 24, 2020, now Pat. No. 11,478,733.

(51) Int. Cl.
*B01D 35/30* (2006.01)
*B01D 29/19* (2006.01)

(52) U.S. Cl.
CPC .......... *B01D 35/306* (2013.01); *B01D 29/19* (2013.01); *B01D 2201/0415* (2013.01); *B01D 2201/4038* (2013.01); *B01D 2201/4092* (2013.01)

(58) Field of Classification Search
CPC .................. B01D 35/306; B01D 29/19; B01D 2201/0415; B01D 2201/4038; B01D 2201/4092; B01D 29/96; B01D 35/30; B01D 2201/301; B01D 2201/316; B01D 2201/4015; B01D 2201/4076; B01D 29/90; B01D 29/21

See application file for complete search history.

(56) References Cited

U.S. PATENT DOCUMENTS

| | | |
|---|---|---|
| 2,692,686 A | 10/1954 | William |
| 2,738,879 A | 3/1956 | Frantz |
| 4,896,783 A | 1/1990 | Leoncavallo et al. |
| 5,084,170 A | 1/1992 | Janik et al. |
| 5,102,541 A | 4/1992 | Breitbach |
| 5,843,313 A | 12/1998 | Bradford |
| 6,361,684 B1 | 3/2002 | Hawkins et al. |
| 6,615,990 B1 | 9/2003 | Jokchas et al. |
| 6,830,683 B2 | 12/2004 | Gundrum et al. |
| 7,662,283 B2 | 2/2010 | Eserkaln et al. |
| 8,268,170 B2 | 9/2012 | Core |

(Continued)

FOREIGN PATENT DOCUMENTS

| | | |
|---|---|---|
| CN | 103071334 A | 10/2014 |
| DE | 3741552 A1 | 10/1994 |

(Continued)

*Primary Examiner* — Waqaas Ali

(57) ABSTRACT

A pedestal for use with a canister filter system and a filter element for positioning and retaining the filter element in the canister filter system includes an at least partially annular body defining a longitudinal axis, a radial direction, and a circumferential direction. Also, the pedestal includes an annular wall that terminates at a bottom free end, and that defines a slot that extends axially upwardly and circumferentially from the bottom free end. A flow aperture extends through the annular wall that is disposed axially above the slot.

8 Claims, 3 Drawing Sheets

(56) References Cited

U.S. PATENT DOCUMENTS

| | | |
|---|---|---|
| 8,709,246 B2 | 4/2014 | Branscomb |
| 9,067,154 B1 | 6/2015 | Branscomb |
| 9,492,768 B2 | 11/2016 | Fick et al. |
| 9,776,116 B2 | 10/2017 | Honermann |
| 10,052,575 B2 | 8/2018 | Downs |
| 10,155,184 B2 | 12/2018 | Ries |
| 10,238,998 B2 | 3/2019 | Cartarius |
| 2002/0108897 A1 | 8/2002 | Pavlin et al. |
| 2004/0050766 A1 | 3/2004 | Jiang |
| 2012/0168359 A1 | 7/2012 | Marshall et al. |
| 2014/0166563 A1 | 6/2014 | Tubby et al. |
| 2016/0082368 A1 | 3/2016 | Morris et al. |
| 2017/0129896 A1 | 5/2017 | Fayolle et al. |

FOREIGN PATENT DOCUMENTS

| | | | | |
|---|---|---|---|---|
| DE | 102013008987 A1 | * | 12/2014 | ............ B01D 29/15 |
| DE | 102014013818 A1 | | 3/2016 | |
| JP | 2005349283 A | | 12/2005 | |
| JP | 3222460 U | | 8/2019 | |
| KR | 101560751 A | | 3/2011 | |
| WO | 2013096179 A1 | | 6/2013 | |
| WO | 2017129896 A1 | | 8/2017 | |
| WO | 2019084440 A1 | | 5/2019 | |

* cited by examiner

FILTER INTERLOCK WITH TABS MATING WITH A PEDESTAL OR A HOUSING

TECHNICAL FIELD

The present disclosure relates generally to canister style filter systems that employ a replaceable filter element used as a fuel-water separator. More specifically, the present disclosure relates to a filter element for use with such filter systems that maximizes the amount of water removed by the fuel-water separator and that eases installation of the replaceable filter element such that is does not fall out of the canister during installation.

BACKGROUND

Liquid filter systems are known for filtering various fluids such as gas, oil, diesel fuel, etc. to remove contaminants from these fluids. In diesel engines, for example, a fuel filter is used to separate out water and debris from the fuel. In particular systems, a series of at least two filters are used. First, a fuel-water separator may be employed to remove the water from the fuel (and some debris in some applications). Next, another fuel filter is connected in series or inline with the fuel-water separator that focuses on removing debris from the fuel.

In some applications, the fuel-water separator is loaded onto the filter base to assemble the canister filter system (sometimes referred to as a "top loaded" canister filter system). In such a case, the fuel may be forced to flow upwards into the filter media that is intended to separate the water from the fuel. This upward flow may not always allow water droplets that have been separated from the fuel to desirably collect in the collection bowl (sometimes referred to as the "water bowl") or sump, reducing the filter's ability to remove water from the fuel as intended.

U.S. Pat. No. 5,084,170 A discloses a fuel filter assembly that employs a base, which mounts a disposable filter element cartridge. The cartridge includes a dual stage filter system wherein fuel flows axially to a primary filter element for removing particulate matter and coalescing water droplets, and then axially to a secondary filter stage, which function as a water barrier. The filter fuel flows axially and exits through an outlet passage in the base. Water may be collected in a sump. The cartridge is retained on the base by a collar which engages against a roll seam structure of the cartridge. In one embodiment, the base has a canister configuration for receiving the cartridge.

As can be seen, the '170 patent fails to disclose a fuel-water separator that maximizes the amount of water that is removed since a smaller percentage of the filtering process is focused on water removal and is performed after the filtering of debris from the fuel. In FIG. 2 of the '170 patent, it is apparent that water may undesirably collect at this first stage of filtering before reaching a water bowl or a sump.

Also, the center tube of the filter element provides support for the filter media, but may not always provide the desired location, and retention. This may be particularly true for top loaded filter elements that may have a tendency to fall out of the canister (sometimes referred to as the housing) if the canister is tipped upside down before being secured via a fastener, threads, or the like. The prior art including the '170 patent fail to disclose a solution to this problem.

SUMMARY OF THE DISCLOSURE

A canister filter system according to an embodiment of the present disclosure may comprise a filter element that includes at least partially a cylindrical configuration and that defines a longitudinal axis, and a radial direction. The filter element may include an annular filter media defining a central passage, a center tube that is disposed in the central passage of the annular filter media that defines a central reservoir, and the annular filter media surrounds the center tube and the central reservoir, and a central fluid supply tube that is disposed in the central reservoir of the center tube, defining a supply passage. A top open end joined to the center tube may be disposed along the longitudinal axis, the top open end including an opening allowing fluid to flow from the central reservoir to the outside of the filter element, while a bottom open end may be joined to the center tube opposite the top open end disposed along the longitudinal axis. A canister may include a top closed end, and a bottom open end disposed along the longitudinal axis. A pedestal may include an at least partially annular body, an annular wall that terminates at a bottom free end, and that defines a slot that extends axially upwardly and circumferentially from the bottom free end, as well as a flow aperture that extends through the annular wall. The pedestal may be attached to the top closed end of the canister.

A filter element according to an embodiment of the present disclosure may comprise at least a partially annular configuration and that defines a longitudinal axis, a radial direction, and a circumferential direction. The filter element may comprise an annular filter media defining a central passage, a center tube that is disposed in the central passage of the annular filter media that defines a central reservoir, the annular filter media surrounds the center tube and the central reservoir, and a central fluid supply tube that is disposed in the central reservoir of the center tube, defining a supply passage. A top open end may be joined to the center tube disposed along the longitudinal axis, the top open end including an opening allowing fluid to flow from the central reservoir to the outside of the filter element, while a bottom open end may be joined to the center tube opposite the top open end disposed along the longitudinal axis. A locking feature may be disposed proximate to the top open end, the locking feature including a tab that extends radially from the center tube or the central fluid supply tube or a slot that is formed on the center tube or the central fluid supply tube that extends axially and circumferentially.

A pedestal for use with a canister filter system and a filter element for positioning and retaining the filter element in the canister filter system according to an embodiment of the present disclosure is provided. The pedestal may comprise an at least partially annular body defining a longitudinal axis, a radial direction, and a circumferential direction, and may include an annular wall that terminates at a bottom free end, and that defines a slot that extends axially upwardly and circumferentially from the bottom free end. A flow aperture may extend through the annular wall that is disposed axially above the slot.

DETAILED DESCRIPTION

Figure 1:
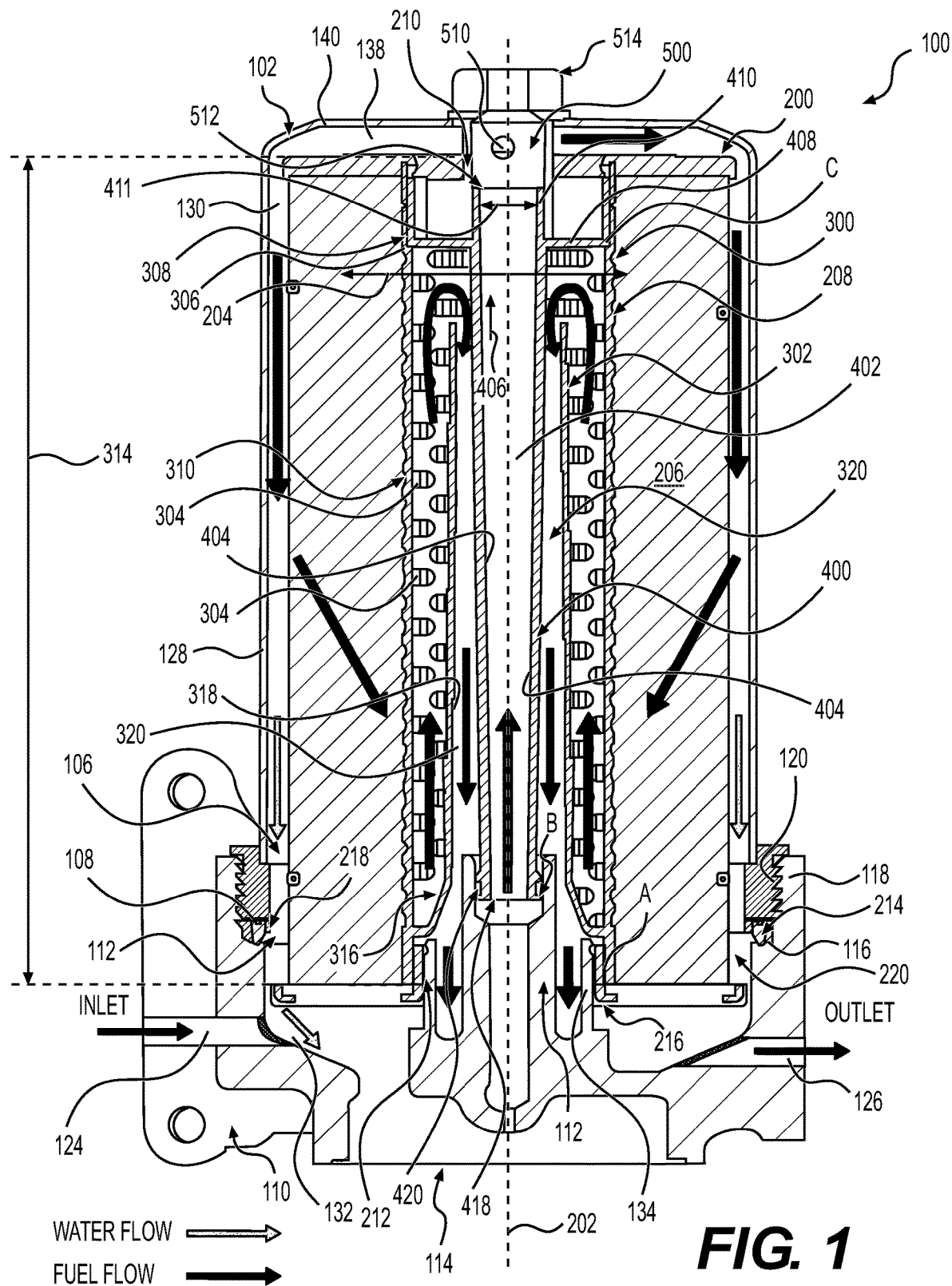
FIG. 1 is a front sectional view of a filter assembly that includes a fuel-water separator constructed according to an embodiment of the present disclosure, as well as a secondary fuel filter that is connected to the fuel-water separator inline (or in series) after the fuel-water separator.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

First, a filter system will now be described to give the reader the proper context for understanding how various embodiments of the present disclosure are used. It is to be understood that this description is given as exemplary and not in any limiting sense. Any embodiment of an apparatus or method described herein may be used in conjunction with any filter system.

Then, a filter element that is constructed according to various embodiments to maximize the water removal in fuel-water separator or other similar applications will be discussed. In some embodiments, a center tube with a central fluid supply tube may be provided that allows for upward flow of the fuel before it reaches the filter media near the top of the filter system to maximize the amount of water removal.

The canister filter system 100 may be used to filter fluids such as diesel or gasoline or other liquid fuels, lubrication oil, hydraulic fluid for hydraulic power systems, transmission fluid, or even possibly intake air for an engine. The canister filter system 100 may also be used as a fuel/water separator filter. The canister filter system 100 with the features described herein could be adapted by those of ordinary skill in this art to serve many different purposes and suit many other applications. In addition, the attributes or features of a fuel-water separator of one embodiment may be used on a debris filter according to another embodiment, or vice versa, etc.

Figure 2:
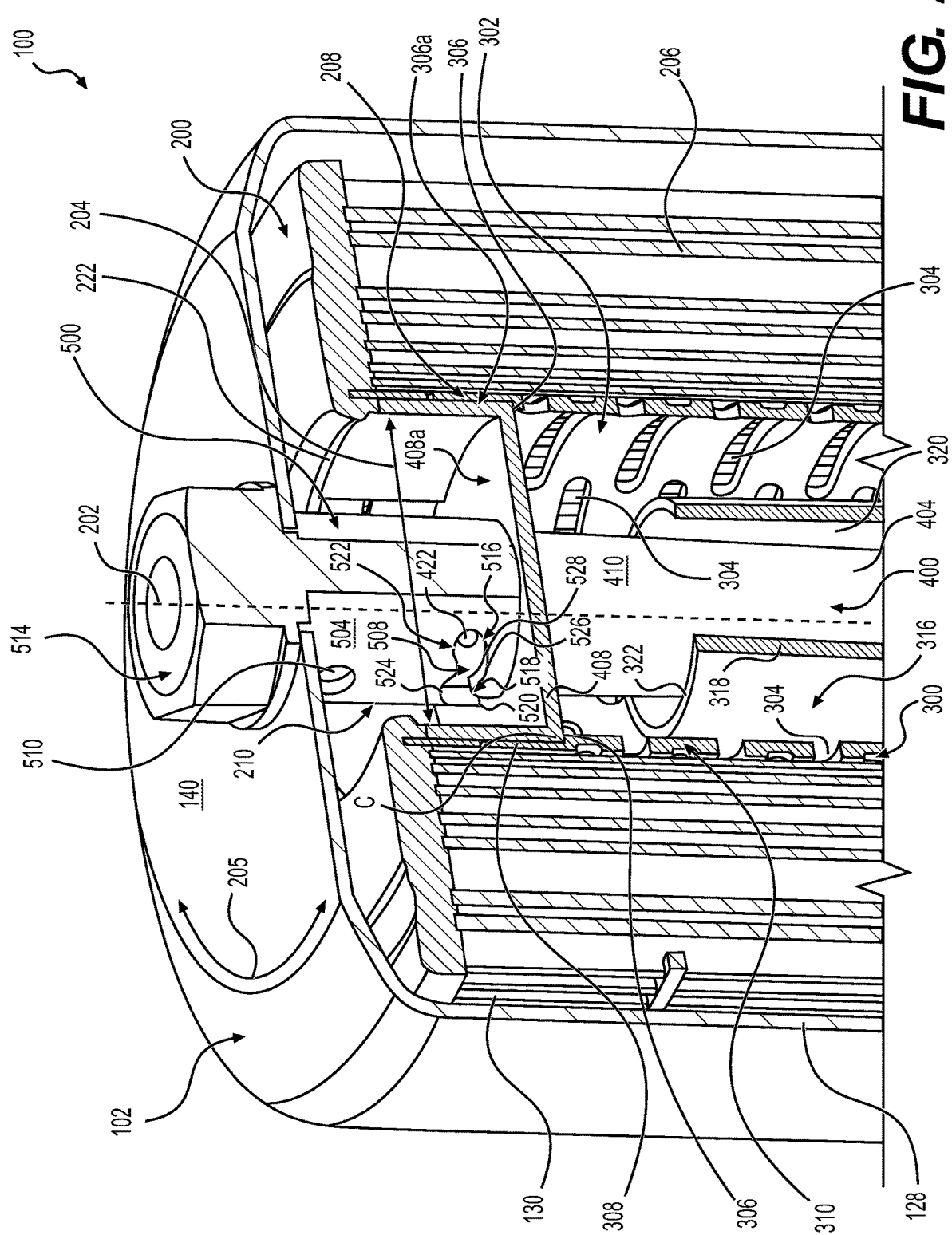
FIG. 2 is an enlarged detail view of the top portion of the fuel-water separator, showing a pedestal/canister with slots and a centertube having a central fluid supply tube with tabs that mate with the slots for retaining the fuel-water separator to the canister.

FIG. 1 illustrates a canister filter system 100 according to an embodiment of the present disclosure that comprises a filter element 200 (e.g. a fuel-water separator) that includes at least partially a cylindrical configuration, and that defines a longitudinal axis 202, a radial direction 204, and a circumferential direction 205 (see FIG. 2).

More specifically as best seen in FIG. 2, the filter element 200 may include an annular filter media 206 defining a central passage 208, and a center tube 300 that is disposed in the central passage 208 of the annular filter media 206 that defines a central reservoir 302, and a plurality of apertures 304 that are in fluid communication with the central reservoir 302. As can be seen in FIGS. 1 and 2, the annular filter media 206 surrounds the center tube 300, the plurality of apertures 304, and the central reservoir 302 in some embodiments. As best seen in FIG. 2, a top open end 210 may be joined to the center tube 300 that is disposed along the longitudinal axis 202, and a bottom open end 212 (see FIG. 1) may be joined to the center tube 300 that is opposite to the top open end 210, and that is also disposed along the longitudinal axis 202.

In addition, as best seen in FIG. 1, a central fluid supply tube 400 may be disposed in the central reservoir 302 of the center tube 300, defining a supply passage 402 that is not in fluid communication with the central reservoir 302.

A canister 102 (may also be referred to as a housing) may also be provided that includes a top closed end 104, and a bottom open end 106 that are disposed along the longitudinal axis 202, as well as an upper sealing portion 108 (i.e. relative to the seal that contacts this portion as will be discussed later herein) disposed proximate to the bottom open end 106, and a base 110 that defining a top open end 112, a bottom open end 114, and a lower sealing portion 116 (i.e. relative to the seal that contacts this portion), facing the upper sealing portion 108 of the canister 102.

The filter element 200 may be configured to selectively allow fluid to pass through the filter element 200 into the center tube 300, and to repel water from passing through the filter element 200. In certain embodiments, the annular filter media 206 may include a material that is water repellant (e.g. a hydrophobic membrane may be employed).

The base 110 may include internal threads 118 that are disposed adjacent to the top open end 112 of the base 110, while the canister 102 includes external threads 120 that are disposed adjacent to the bottom open end 106 of the canister 102 that mate with the internal threads 118 of the base 110.

Looking more closely at the central fluid supply tube 400 in FIG. 2, this tube 400 includes a body 404 of revolution (so called since at least part of its body may be modeled by rotating geometry about an axis), and an inner conical surface 404 (see FIG. 1) that defines the supply passage 402 having a full diameter (as opposed to an annular configuration or other obstructed configuration) that increases along an upward axial direction 406. This may not be the case in other embodiments of the present disclosure. The inner conical surface may provide draft, allowing the central fluid supply tube to be more easily manufactured via a molding process.

With continued reference to FIG. 1, an inlet tube 122 may extend from the base 110, engaging the central fluid supply tube 400, forming a fluid tight seal with the central fluid supply tube 400 in a manner that will be described more fully later herein. This seal may prevent the intermingling of filtered fluid with unfiltered fluid.

The base 110 also defines an inlet 124 that is in fluid communication with the inlet tube 122 for introducing the fluid that is to be filtered (e.g. fuel-water), and an outlet 126 that is in fluid communication with the central reservoir 302 of the center tube 300, for conveying filtered fluid (e.g. fuel) to the next filtering stage (e.g. a debris filter element, not shown).

In some embodiments, an integrated seal member 214 may be attached to the bottom open end 212 of the filter element 200. This integrated seal member 214 may include a radially inner mounting portion 216, a radially outer seal portion 218, and an apertured connecting portion 220 that extends from the radially inner mounting portion 216 to the radially outer seal portion 218. After installation, the radially outer seal portion 218 contacts the upper sealing portion 108 of the canister 102, and the lower sealing portion 116 of the base 110 below the internal threads 118 of the base 110, and the external threads 120 of the canister 102. Other arrangements and configurations of these various features are possible in other embodiments of the present disclosure. This seal may help prevent the leakage of fluid out of the canister filter system 100.

The canister 102 further comprises an outside wall 128 (see also FIG. 2) that is spaced away radially outwardly from the annular filter media 206, forming a downward flowing fluid channel 130 that is in fluid communication with a downwardly extending water collection channel 132 (see FIG. 1). Hence, water that cannot pass through the annular filter media 206 is directed downwardly through channels 130, 132 to a water bowl (not shown) that is attached to the bottom open end 114 of the base 110 (e.g. via threads or the like).

Looking more closely at the base 110 in FIG. 1, an annular wall 134 that radially surrounds the inlet tube 122 can be seen. This annular wall 134 may radially contact the radially inner mounting portion 216, forming a fluid tight seal therewith. This helps force the fuel-water supplied fluid to travel upwards through the central fluid supply tube 400, until it reaches a radially extending flow channel 138 that is defined by a top wall 140 of the canister (see also FIG. 2) that is spaced axially away from the top open end 210 of the filter element 200. The radially extending flow channel 138 is in fluid communication with the downward flowing fluid channel 130 (that has an annular configuration). The canister 102 also has a pedestal 500 (may be attached to the canister or formed unitary with the canister) that defines a central flow passage 512 (see FIG. 1) that is in fluid communication with the supply passage 402 of the central fluid supply tube 400. The pedestal 500 defines an aperture 510 that provides fluid communication between the central flow passage 512, and the radially extending flow channel 138, completing the flow circuit of the first filtering stage as will be discussed in further detail later herein.

The center tube 300 may also include a standpipe 316 including another inner conical surface 318 that is spaced away from the central fluid supply tube 400, defining a downward flow passage 320 with a flow flux that increases along a downward axial direction (opposite of 406).

Now, a filter element 200 that may be used with the canister filter system 100 as just discussed will now be described. The filter element 200 may be a replacement part.

Looking at FIGS. 1 and 2, the filter element 200 may include at least a partially annular configuration and that defines a longitudinal axis 202, a radial direction 204, and a circumferential direction 205 as alluded to earlier herein.

The filter element 200 may comprise an annular filter media 206 defining a central passage 208, and a center tube 300 that is disposed in the central passage 208 of the annular filter media 206 that defines a central reservoir 302, and a plurality of apertures 304 that are in fluid communication with the central reservoir 302. The annular filter media 206 may surround the center tube 300, and the plurality of apertures 304, as well as the central reservoir 302. As a result of this arrangement, fluid may pass through the filter media, then through the apertures of the center tube and into the central reservoir. A top open and may be provided as alluded to earlier as well as a bottom end, which may be open or closed, etc.

A central fluid supply tube 400 may be disposed in the central reservoir 302 of the center tube 300, forming an annular passage therebetween. On the other hand, the tube 400 may defining a supply passage 402 that is not in fluid communication with the central reservoir 302, and that defines a fully circular flow flux. That is to say, the supply passage 402 may be unobstructed to maximize the incoming flow of fluid (as best seen in FIG. 1).

As best seen in FIG. 2, the center tube 300 may include an annular shelf 306, and the central fluid supply tube 400 may include a platform 408 that extends radially outwardly from the central fluid supply tube 400. The platform 408 may engage the annular shelf 306 (may form a fluid tight seal in certain embodiments). In some embodiments, the platform may be attached to the annular shelf via welding, adhesives, overmolding, etc. The central fluid supply tube may comprise an elastomeric, rubber, or a foam material or the like to provide flexibility and sealing capabilities. In other embodiments, the central fluid supply tube may comprise a more rigid material such as a plastic (e.g. a thermoplastic, a polyurethane, etc.). The annular filter media 206 may include a water repellant material in some embodiments.

Looking at FIG. 2, it can be appreciated that the center tube 300 may include a solid wall 308 (i.e. lacks apertures) that extends axially upwardly from the annular shelf 306 to the top open end 210 of the filter element 200, and an apertured wall 310 that extend axially downwardly from the annular shelf 306. The axial length of the apertured wall may be approximately 80% or more (e.g. about 87% to 89%) of the overall axial length of the center tube, whereas the axial length of the solid wall may be less than 10% (e.g. about 6% to 7%) of the overall axial length of the center tube, in some embodiments of the present disclosure. These ratios may be different in other embodiments of the present disclosure.

In certain embodiments of the present disclosure, the central fluid supply tube 400 includes a conical surface (e.g. inner conical surface 404 as shown in FIG. 1) that defines the supply passage 402, and a diameter 411 that is greatest proximate to the top open end 210 of the filter element 200. An opposite arrangement may be employed in other embodiments of the present disclosure.

As best seen in FIG. 1, an integrated seal member 214 may be attached to the filter element 200 that includes a sealing portion (e.g. radially outer seal portion 218) that is disposed radially away from the annular filter media 206, and axially between the top open end 210, and the bottom end (e.g. bottom open end 212) of the filter element 200. This may not be the case in other embodiments of the present disclosure.

The center tube 300 may also comprise a standpipe 316 that extends from the bottom end of the filter element 200 axially upwardly toward the platform 408 of the central fluid supply tube 400. The standpipe 316 may be spaced axially away from the platform 408 of the central fluid supply tube 400, and radially outwardly away from the central fluid supply tube 400, forming the downward flow passage 320 therebetween as alluded to earlier herein.

Next, a center tube and/or a central fluid supply tube may be provided as separate components, an assembly, or a unitary component to manufacture the filter element 200 as just described will be discussed with reference to FIGS. 1 and 2.

Looking at FIG. 2, such a center tube 300 and a central fluid supply tube 400 combination may be characterized as follows. The center tube body 312 may define a longitudinal axis (e.g. may be the same as 202), a radial direction (e.g. may be the same as 204), a circumferential direction (e.g. may be the same as 205), and a longitudinal length 314 (shown in FIG. 1), and a central reservoir 302. An apertured annular wall (e.g. apertured wall 310) may extend axially the majority of the longitudinal length 314, and a first annular solid wall (e.g. solid wall 308) may extend axially from the apertured annular wall. A central fluid supply tube 400 may be disposed in the central reservoir 302, which includes a second annular solid wall 410 that is radially surrounded by the apertured annular wall (e.g. apertured wall 310) of the center tube 300. This wall 410 may radially surround, and define a supply passage 402 with a fully circular flow flux. Put another way, the surface area perpendicular to the fluid flow in this passage is completely circular and unobstructed. This may not be the case for other embodiments of the present disclosure.

Focusing on FIG. 2, the center tube 300 includes a radially outwardly extending shelf 306a that is disposed axially between the apertured annular wall (e.g. apertured wall 310) and the first annular solid wall (e.g. solid wall 308), facing axially upwardly (along direction 406). This may not be the case for other embodiments of the present disclosure. The central fluid supply tube 400 may include a radially outwardly extending rib 408a that rests on the radially outwardly extending shelf 306a of the center tube 300. The second annular solid wall 410 (best seen in FIG. 1) may extend axially upwardly past the radially outwardly extending shelf 408a, being radially surrounded by the first annular solid wall (e.g. solid wall 308). Other arrangements are possible in other embodiments of the present disclosure.

As best seen in FIG. 2, the standpipe 316 is radially interposed between a portion of the apertured annular wall 310 of the center tube 300 and the second annular solid wall 410 of the central fluid supply tube 400. This may not be the case for other embodiments of the present disclosure. More specifically, the standpipe may define an upper axial extremity 322 that is spaced axially away from the radially outwardly extending rib 408a and radially away from the second annular solid wall 410. The inner conical surfaces 318, 404 of the standpipe 316 versus that central fluid supply tube 400 (see FIG. 1) may have opposite axial drafts. That is to say, one is drafted to be demolded along direction 406 while the other is drafted to be demolded in the opposite axial direction. This may not be the case for other embodiments of the present disclosure.

In some embodiments, the center tube 300 comprises a first material (e.g. a plastic such as a polyurethane), while the central fluid supply tube comprises a second material that is different than the first material and that is more flexible than the first material (e.g. an elastomer, a rubber, etc.). As best seen in FIG. 1, the central fluid supply tube 400 may include an axial bottom end 418 with an undulating sealing profile 420 in a plane containing the longitudinal axis 202 and the radial direction 204 (e.g. the sectioned plane of FIG. 1). This feature may mate with a complimentarily shaped feature (or not) of the inlet tube 122 of the base 110, forming a fluid tight seal therewith. This feature may also take the form of a seal receiving aperture such as a slot that is configured to receive an O-ring or another type of seal, etc. as shown in FIG. 1.

In other embodiments, the central fluid supply tube may be made from a plastic such as polyurethane, same as the center tube for example. Other material combinations are possible in other embodiments of the present disclosure.

Next, a canister filter system will be described with reference to FIGS. 1 thru 3 according to various embodiments of the present disclosure that may ease assembly to alleviate some of the aforementioned problems.

Figure 3:
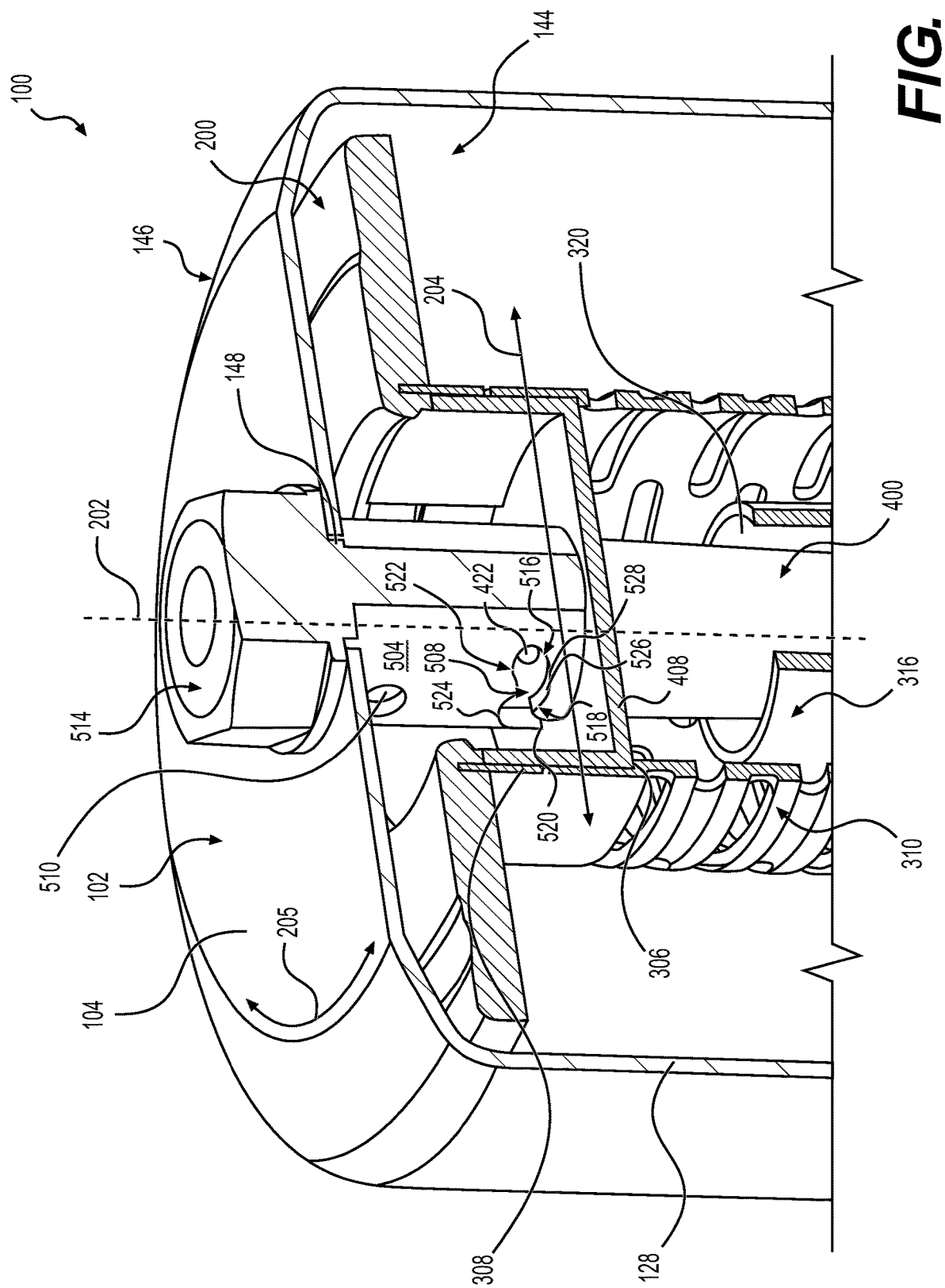
FIG. 3 is a further enlarged detail view of FIG. 2 with the filter media and the outer portion of the center tube removed, showing more clearly the central fluid supply tube and the mating of its tabs with the slots of the pedestal/canister.

In FIGS. 1 thru 3, such a canister filter system 100 may comprise a filter element 200 that is constructed in like manner as previously described herein including having annular filter media 206, a center tube 300, a central fluid supply tube 400, and a canister 102.

However as best seen in FIG. 3, a pedestal 500 may also be provided that includes an at least partially annular body 502 including an annular wall 504 that terminates at a bottom free end 506, and that defines a slot 508 that extends axially upwardly and circumferentially from the bottom free end 506. A flow aperture 510 may extend through the annular wall 504 as alluded to earlier herein. The pedestal 500 may be attached to the top closed end 104 of the canister 102 by being integrally molded therewith, adhered, welded, etc. The shape and number of the slots as well as the flow apertures may be varied as needed or desired in other embodiments of the present disclosure. For example, two similarly or identically configured slots may be provided that are on opposite sides of the pedestal. Similarly, the central fluid supply tube may include two opposite tabs that engage the two opposite slots, etc.

The canister 102 may define an interior 144, and an exterior 146, and the pedestal 500 may be disposed in the interior 144. The pedestal 500 may have a portion that extends through an aperture 148 of the canister 102 to a drive structure 514 (e.g. a hexagonal drive structure that is intended to be rotated using a wrench, a socket, etc.) that is disposed on the exterior 146 or on top of the canister 102. The drive structure may be omitted or may be differently configured in other embodiments of the present disclosure.

The flow aperture 510 may have any suitable configuration such as cylindrical configuration, and may be at least partially disposed axially, circumferentially, and radially above the slot 508 as shown, but not necessarily so. The shape and number of these flow apertures may be varied as needed or desired in various embodiments of the present disclosure.

The central fluid supply tube 400 may include a solid annular wall (e.g. see reference numeral 410) that is disposed radially within the annular wall 504 of the pedestal 500. A tab 422 may extend radially outwardly from the solid annular wall of the central fluid supply tube 400, and may be disposed in the slot 508 of the pedestal 500 (see FIGS. 2 and 3).

Still referring to FIG. 3, the slot 508 may include a ramp portion 516 that extends circumferentially and axially upwardly, and that is configured to pull the filter element 200 axially upwardly into the canister 102. At such a point in time, the canister and filter element form a subassembly that may be more easily attached to the base.

The tab 422 may include a conical or cylindrical configuration, and the slot 508 may form a detent 518 that is disposed next to the ramp portion 516 to help prevent unwanted rotation and disassembly of the filter element 200 from the canister 102. These various features may be differently configured or omitted altogether in other embodiments of the present disclosure.

It is contemplated that the slot(s) and tab(s) of the pedestal and central fluid supply tube may be swapped for each other in other embodiments of the present disclosure.

As also alluded to earlier herein when looking at FIG. 1, the supply passage 402 of the central fluid supply tube 400 may not be in fluid communication with the central reservoir 302 of the center tube 300, but not necessarily so. This passage may define a flow flux, and the longitudinal axis 202 may pass through the flow flux. Specifically, the longitudinal axis may pass the center of the circular flow flux of this passage.

As also mentioned previously herein, an integrated seal member 214 may be provided that is attached to the bottom open end 212 of the filter element 200. This integrated seal member 214 may include a radially inner mounting portion 216, a radially outer seal portion 218, and an apertured connecting portion 220 that extends from the radially inner mounting portion 216 to the radially outer seal portion 218.

A filter element 200 that may be used with the filter element just described according to various embodiments of the present disclosure will now be discussed with reference to FIGS. 1 thru 3. It is to be understood that the features of that ease assembly may also be present with respect to the debris filter element 200a, and vice versa.

Starting with FIG. 1, the filter element 200, 200a may include at least a partially annular configuration and that defines a longitudinal axis 202, a radial direction 204, and a circumferential direction 205. The filter element 200, 200a may comprise an annular filter media 206 defining a central passage 208, a center tube 300 that is disposed in the central passage 208 of the annular filter media 206 that defines a central reservoir 302. The annular filter media 206 may surround the center tube 300 and the central reservoir 302.

For filter element 200, a central fluid supply tube 400 may be disposed in the central reservoir 302 of the center tube 300, defining a supply passage 402. This feature may be omitted for filter element 200a.

For both filter elements 200, 200a, a top open end 210 may be joined to the center tube 300 disposed along the longitudinal axis 202. The top open end 210 includes an opening 222 that allows fluid to flow from the central reservoir 302 to the outside of the filter element 200, 200a.

Also, a bottom open end 212 may be joined to the center tube 300 opposite the top open end 210 disposed along the longitudinal axis 202.

Considering both filter elements 200, 200a, a locking feature (see FIGS. 2 and 3) may be disposed proximate to the top open end 210, including a tab 422 that extends radially from the center tube 300 or the central fluid supply tube 400, or a slot 508 that is formed on the center tube 300 or the central fluid supply tube 400 that extends axially and circumferentially.

For filter element 200 as best seen in FIGS. 2 and 3, the supply passage 402 of the central fluid supply tube 400 is not in fluid communication with the central reservoir 302 of the center tube 300, and defines a fully circular flow flux. Also, the locking feature includes a tab 422 that extends radially outwardly from the central fluid supply tube 400.

Moreover, the center tube 300 includes an annular shelf 306 that extends radially outwardly from the central reservoir 302, and the central fluid supply tube 400 includes a platform 408 that extends radially outwardly from the central fluid supply tube 400. The platform 408 engages the annular shelf 306, and the tab 422 is disposed axially above the platform 408, and includes a cylindrical or conical shape.

As mentioned earlier herein, the central fluid supply tube 400 may comprise an elastomer, a rubber, or a foam material, and the annular filter media 206 includes a water repellant material. This may not be the case for other embodiments of the present disclosure.

Also, the center tube 300 may include a solid wall 308 that extends axially upwardly from the annular shelf 306 to the top open end 210 of the filter element 200, and an apertured wall 310 that extend axially downwardly from the annular shelf 306. Other configurations may be provided in other embodiments of the present disclosure.

Looking at FIGS. 1 and 3 together, the central fluid supply tube 400 may include another solid wall (e.g. see reference numeral 410) that defines a radially inner conical surface (e.g. see reference numeral 404) that defines the supply passage 402, and a diameter 411 that is greatest proximate to the top open end 210 of the filter element 200, and the tab 422 extends radially outwardly from the solid wall.

An integrated seal member 214 may be attached to the filter element 200, and includes a sealing portion (e.g. see reference numeral 218) that is disposed radially away from the annular filter media 206, and axially between the top open end 210, and the bottom end (e.g. see reference numeral 212).

The pedestal/canister combination may be provided as a replacement part(s). The pedestal 500 itself may have an annular body 502 that defines a longitudinal axis, a radial direction, and a circumferential direction (may be the same as the longitudinal axis 202, radial direction 204, and circumferential direction 205 of the filter element 200 shown in FIG. 2). This body 502 may also include an annular wall 504 that terminates at a bottom free end 506, and that defines a slot 508 that extends axially upwardly and circumferentially from the bottom free end 506. A flow aperture 510 may extend through the annular wall 504 that is disposed axially above the slot 508 (i.e. at an axial level that is higher than the slot).

As best seen in FIG. 3, this slot 508 may include an axial portion 520, and a circumferential portion 522, and the circumferential portion 522 extends circumferentially along a wavy path 524, forming a lower catch point 526 at the intersection of the axial portion 520, and the circumferential portion 522. This feature helps to prevent the unintentional rotation and disassembly of the filter element 200 from the canister 102.

More specifically, the circumferential portion 522 moves axially downwardly defining a trough point 528 that is spaced circumferentially from the lower catch point 526, and then extends upwardly and terminates, forming a ramp portion 516.

A canister portion (e.g. see reference numeral 102) includes an annular outer wall (e.g. see reference numeral 128) that is spaced radially away from the annular wall 504 of the pedestal 500, and a top wall 140 that is disposed axially above the pedestal 500, and that is attached to the pedestal 500 in various manners as previously described herein.

A drive structure 514 may also be attached to the pedestal 500, which extends through an aperture 148 of the top wall 140, and axially above the top wall 140. Other configurations for the canister portion and the pedestal are possible in other embodiments of the present disclosure.

The integrated seal member and/or the central fluid supply tube may be constructed using any suitable material and manufacturing process. For example, a material of urethane having a durometer of 20 to 95 Shore A (e.g. 60 Shore A) may be employed that is injection molded into shape. Or, a rigid polyurethane may be employed, etc.

Any of the aforementioned features, components, or assemblies may be varied in configuration to be different in other embodiments of the present disclosure than what has been specifically shown and described herein.

INDUSTRIAL APPLICABILITY

In practice, a filter element, a center tube, a central fluid supply tube, a pedestal, a canister, a pedestal/canister combination, a center tube and central fluid supply tube combination, or a canister filter system according to any embodiment disclosed herein may be obtained or provided in an OEM (original equipment manufacturer) or aftermarket context. The components may be used in various manners and filtering stages, and applications.

Looking at FIG. 1, water removal for a fuel-water separator may be increased using various embodiments of the present disclosure. Initially, fluid such as a fuel-water mixture may flow into the inlet 124, and toward the inlet tube 122 as shown, pass through the central fluid supply tube 400 to the pedestal 142, then through the pedestal 142 over the top of the filter element 200, and down the sides of the filter element 200.

Once the fuel-water mixture reaches the radially outer surface of the annular filter media 206, then the fuel and water will tend to separate. Since fuel is lighter than water, the water will naturally begin to condense and fall into the water bowl (not shown). Also, the water cannot pass through the annular filter media 206 due to its hydrophobic properties, also causing the water to fall down into the water bowl. The water bowl may be detached, emptied, and reattached to the base as needed or desired. Or, a spigot or a valve may be supplied to drain the water.

During this separation process, filtered fuel as well as condensed water are kept separate from the incoming flow of the fuel-water mixture by fluid tight seals provided between the integrated seal member 214 and the annular wall 136 at point A, between the inlet tube 122, and the central fluid supply tube 400 at point B, and between the central fluid supply tube 400, and the center tube 300 at point C (see FIG. 2).

Since the water-fuel mixture is forced to run the entire axial length of the annular filter media 206, the efficacy of water removal may be enhanced or even maximized in some embodiments of the present disclosure.

Fuel or other fluid then passes through the annular filter media 206, then through the apertures 304 of the center tube 300, up and down the standpipe, down through the central reservoir 302, and to the outlet 126, and eventually to the next filtering stage.

Various embodiments of the present disclosure may also ease assembly. Looking at FIGS. 1 thru 3, one skilled in the art may understand that the filter element may be attached to the canister as follows, creating a subassembly.

First, the filter element 200, 200*a* is inserted axially upwardly until a tab 422 is inserted into a slot 508. Then, the filter element 200, 200*a* is rotated so that the tab 508 will not easily fall out of the slot 508. The filter element 200, 200*a* is now attached to the canister 102. Depending on the configuration of the tab 422, and the slot 508, as well as the amount of rotation of the filter element 200, 200*a* relative to the canister 102, the filter element 200, 200*a* may be positioned at a desired axial location relative to the canister 102.

Then, the canister/filter element subassembly is inserted onto the inlet tube 122 of the base 110. Finally, the subassembly is secured to the base 110, completing the assembly process with respect to at least one filtration stage of the canister filter system 100. During these steps, the appropriate seals are formed to prevent unfiltered fluid from intermingling with filtered fluid, or leaking form the system, etc.

Securing the subassembly may be accomplished in various ways including using a threaded connection as shown in FIG. 1, using fasteners, clips, etc.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A canister filter system comprising:
a filter element that includes at least partially a cylindrical configuration and that defines a longitudinal axis, and a radial direction, the filter element comprising:
an annular filter media defining a central passage;
a center tube that is disposed in the central passage of the annular filter media that defines a central reservoir, and the annular filter media surrounds the center tube and the central reservoir;
a central fluid supply tube that is disposed in the central reservoir of the center tube, defining a supply passage;
a top open end joined to the center tube disposed along the longitudinal axis, the top open end including an opening allowing fluid to flow from the central reservoir to the outside of the filter element;
a bottom open end joined to the center tube opposite the top open end disposed along the longitudinal axis:
a canister that includes a top closed end, and a bottom open end disposed along the longitudinal axis;
a pedestal including
an at least partially annular body;
an annular wall that terminates at a bottom free end, and that defines a slot that extends axially upwardly and circumferentially from the bottom free end; and
a flow aperture that extends through the annular wall; and
wherein the pedestal is attached to the top closed end of the canister; and
an integrated seal member that is attached to the bottom open end of the filter element, the integrated seal member including a radially inner mounting portion, a radially outer seal portion, and an apertured connecting portion that extends from the radially inner mounting portion to the radially outer seal portion.

2. The canister filter system of claim 1, wherein the canister defines an interior, and an exterior, and the pedestal is disposed in the interior, and extends through an aperture of the canister to a drive structure that is disposed on the exterior.

3. The canister filter system of claim 1, wherein the flow aperture includes a cylindrical configuration, and is at least partially disposed axially, circumferentially, and radially above the slot.

4. The canister filter system of claim 1, wherein the central fluid supply tube includes a solid annular wall that is disposed radially within the annular wall of the pedestal.

5. The canister filter system of claim 4, further comprising a tab that extends radially outwardly from the solid annular wall of the central fluid supply tube, and that is disposed in the slot of the pedestal.

6. The canister filter system of claim 5, wherein the slot includes a ramp portion that is configured to pull the filter element axially upwardly into the canister.

7. The canister filter system of claim 6, wherein the tab includes a conical or cylindrical configuration, and the slot forms a detent that is disposed next to the ramp portion.

8. The canister filter system of claim 1, wherein the supply passage of the central fluid supply tube is not in fluid communication with the central reservoir, and defines a flow flux, and the longitudinal axis passes through the flow flux.

\* \* \* \* \*